(12) United States Patent
Khayyat et al.

(10) Patent No.: US 10,162,857 B2
(45) Date of Patent: Dec. 25, 2018

(54) OPTIMIZED INEQUALITY JOIN METHOD

(71) Applicant: QATAR FOUNDATION FOR EDUCATION, SCIENCE AND COMMUNITY, Doha (QA)

(72) Inventors: Zuhair Khayyat, Thuwal (SA); William Lucia, Doha (QA); Mourad Ouzzani, Doha (QA); Paolo Papotti, Doha (QA); Jorge-Arnulfo Quiane-Ruiz, Doha (QA); Nan Tang, Doha (QA)

(73) Assignee: Qatar Foundation For Education, Science and Community, Doha (QA)

( * ) Notice: Subject to any disclaimer, the term of this patent is extended or adjusted under 35 U.S.C. 154(b) by 362 days.

(21) Appl. No.: 15/237,604

(22) Filed: Aug. 15, 2016

(65) Prior Publication Data

US 2017/0060944 A1 Mar. 2, 2017

Related U.S. Application Data

(60) Provisional application No. 62/212,558, filed on Aug. 31, 2015.

(51) Int. Cl.
*G06F 17/30* (2006.01)
(52) U.S. Cl.
CPC .. *G06F 17/30454* (2013.01); *G06F 17/30324* (2013.01); *G06F 17/30339* (2013.01)
(58) Field of Classification Search
CPC ......... G06F 17/30454; G06F 17/30324; G06F 17/30339
USPC ....................................................... 707/714
See application file for complete search history.

(56) References Cited

U.S. PATENT DOCUMENTS

| 5,557,791 | A | 9/1996 | Cheng et al. |
| 7,873,629 | B1 | 1/2011 | Morris et al. |
| 8,793,241 | B2 | 7/2014 | Koch et al. |
| 2007/0294319 | A1 | 12/2007 | Mankad et al. |
| 2014/0137119 | A1 | 5/2014 | Hyde et al. |

FOREIGN PATENT DOCUMENTS

EP          529916 A2     3/1993

OTHER PUBLICATIONS

Li, Zhe, and Kenneth A. Ross. "PerfJoin: An alternative to two-way semijoin and bloomjoin", Proceedings of the fourth international conference on Information and knowledge management. ACM, 1995.
Ramesh, Sukriti, Odysseas Papapetrou, and Wolf Siberski. "Optimizing distributed joins with bloom filters", Distributed Computing and Internet Technology. Springer Berlin Heidelberg, 2009. 145-156.

(Continued)

*Primary Examiner* — Joshua Bullock
(74) *Attorney, Agent, or Firm* — Richard C. Litman

(57) ABSTRACT

The optimized inequality join method is a method for joining relational tables on input inequality conditions. The optimized inequality join method is a relatively fast inequality join method using permutation arrays to store positional information for sorted attributed values. Additionally, space efficient bit arrays are used to enable optimization, such as Bloom filter indices, thus providing faster computation of the join results. The method may be used, for example, for joining various inequalities associated with a variety of measured environmental conditions for raising an alarm when certain conditions are met.

14 Claims, 8 Drawing Sheets

(56) References Cited

OTHER PUBLICATIONS

Zuhair Khayyat et al., "Lightning Fast ans Space Efficient Inquality Joins", Proceedings of the VLDB Endowment, vol. 8, Iss. 13, Abstract only, printed from Internet Aug. 31, 2015.

Zuhair Khayyat et al., "Lightning Fast ans Space Efficient Inquality Joins", Proceedings of the VLDB Endowment, vol. 8, Iss. 13, (2015) pp. 2074-2085, available at www.vldb.org/pvldb/vol8/p2074-khayyat.pdf.

| East | id | dur | rev | cores |
|---|---|---|---|---|
| $r_1$ | 100 | 140 | 12 | 2 |
| $r_2$ | 101 | 100 | 12 | 8 |
| $r_3$ | 102 | 90 | 5 | 4 |

101

| West | t_id | time | cost | cores |
|---|---|---|---|---|
| $s_1$ | 404 | 100 | 6 | 4 |
| $s_2$ | 498 | 140 | 11 | 2 |
| $s_3$ | 676 | 80 | 10 | 1 |
| $s_4$ | 742 | 90 | 5 | 4 |

East

(1) Initialization $L_1$ | $r_2(90)$ | $r_2(100)$ | $r_1(140)$ | (sort ↑ on dur)

$L_2$ | $r_3(5)$ | $r_1(12)$ | $r_2(12)$ | (sort ↑ on rev)

$P$ | 1 | 3 | 2 | (permutation array)

$O_1$ | 2 | 3 | 4 | (offset of $L_1$ w.r.t. $L_2$)

$O_2$ | 1 | 3 | 5 | (offset of $L_2$ w.r.t. $L'_2$)

West

$L'_1$ | $s_3(80)$ | $s_4(90)$ | $s_1(100)$ | $s_2(140)$ | (sort ↑ on time)

$L'_2$ | $s_4(5)$ | $s_1(6)$ | $s_3(10)$ | $s_2(11)$ | (sort ↑ on cost)

$P'$ | 2 | 3 | 1 | 4 | (permutation array)

1 2 3 4
$B'$ | 0 | 0 | 0 | 0 | (bit array)
    $s_3$ $s_4$ $s_1$ $s_2$ (2) Visit tuples with regards to $L_2$ (a) visit $L_2$ for $r_3$: (i) $O_2[1] = 1$; (ii) $P'[1] = 2$; (iii) $O_1[P[1]] = 2$; (iv) $B'$: | 0 | 1 | 0 | 0 |  (v) Output: • ——→

(b) visit $L_2[2]$ for $r_1$: (i) $O_2[2] = 3$; (ii) $P'[2] = 3, P'[3] = 1$ (iii) $O_1[P[2]] = 4$; (iv) $B'$: | 1 | 1 | 1 | 0 |  (v) Output: •

(c) visit $L_2[3]$ for $r_2$: (i) $O_2[3] = 5$; (ii) $P'[4] = 4, P'[3] = 1$ (iii) $O_1[P[3]] = 3$; (iv) $B'$: | 1 | 1 | 1 | 1 |  (v) Output: • ——→ $(r_2, s_2)$

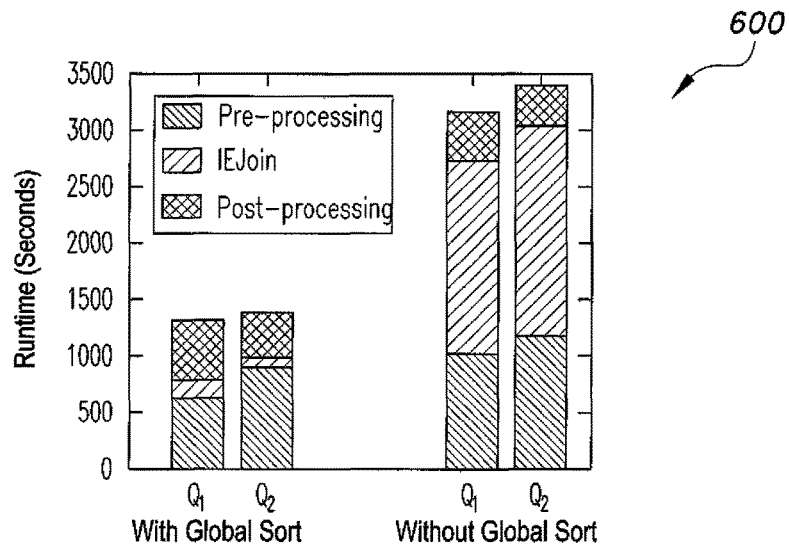
FIG. 6
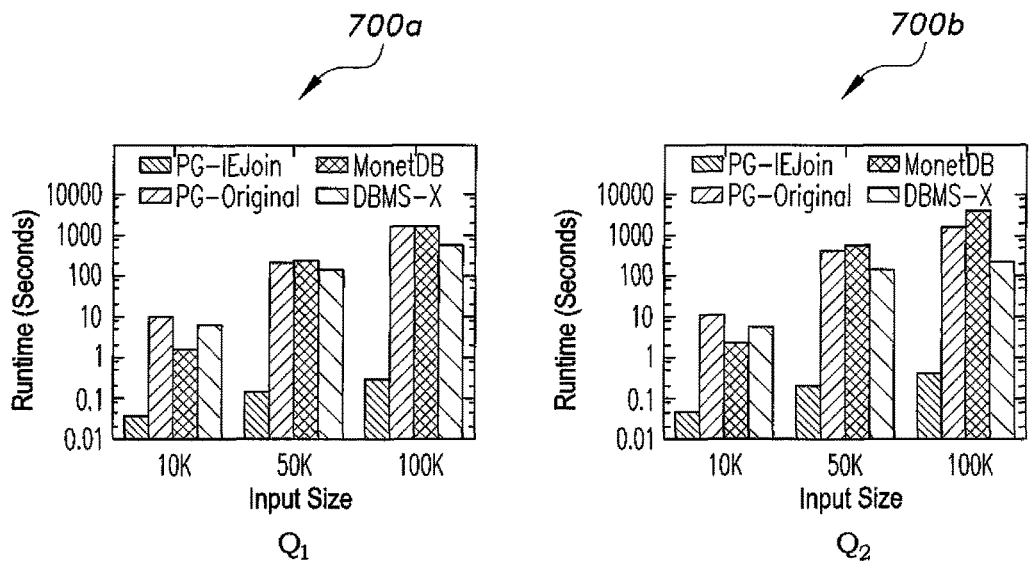
FIG. 7A  FIG. 7B

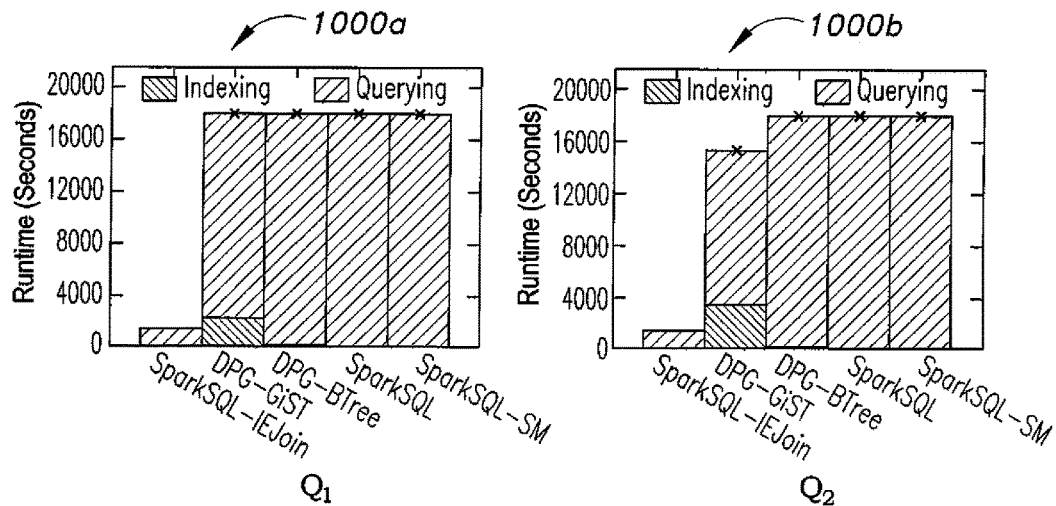
FIG. 10A     FIG. 10B
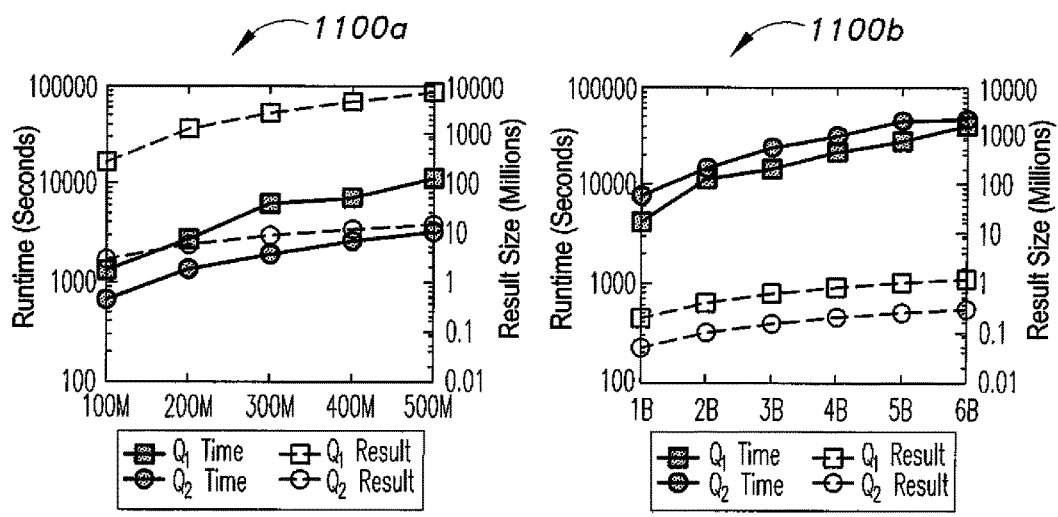
FIG. 11A     FIG. 11B

OPTIMIZED INEQUALITY JOIN METHOD

CROSS-REFERENCE TO RELATED APPLICATION

This application claims the benefit of U.S. Provisional Patent Application Ser. No. 62/212,558, filed Aug. 31, 2015.

BACKGROUND OF THE INVENTION

1. Field of the Invention

The present invention relates to relational database optimization methods, and particularly to an optimized inequality join method that efficiently joins relational tables on inequality conditions.

2. Description of the Related Art

Relational databases are organized into tables that consist of rows and columns of data. The rows are formally called tuples. A database will typically have many tables, and each table will typically have multiple tuples and multiple columns. The tables are typically stored on random access storage devices (DASDs), such as magnetic or optical disk drives. Data may be retrieved from this type of database by a variety of methods. For example, a computer program can extract information from the database without human intervention, or a user can interact with a query system program, which serves as a front end to the database system. "Accessing a table" is used in the art to mean reading information from a table. Since the tables are normally stored on DASD, accessing a table requires transferring all or part of the table from DASD into the RAM of the computer system. When information is needed from a plurality of tables, the tables may be joined by the database software or firmware. Joins allow additional information to be obtained across tables in a meaningful way. A simple example would be that a table of employee information lists an employee's department number as '76', but the definition of department '76' requires reference to another table, the Department-table, which lists the full-department title associated with each department number. In this second table the row for department '76' also contains a column with the department title "Information Systems Department." Thus, a user desiring to generate a report containing a list of all employees, including their department titles, may want to establish a join relationship between the department number column in the Employee-table and the department title column in the Department-table, so that the employee's department can be printed in the title form instead of the numerical form. Ways of specifying and performing joins are the subject of substantial effort. Database tables can be very large, and processing tables can be expensive in terms of computer resources. Therefore, it is important that methods for joining tables be efficient.

Thus, an optimized inequality join method solving the aforementioned problems is desired.

SUMMARY OF THE INVENTION

The optimized inequality join method uses permutation arrays to store positional information for sorted attributed values. Moreover, in contrast to sort-merge joins, space efficient bit-arrays are used in algorithms that enable optimizations, such as Bloom filter indices, for fast computation of the join results. As examples, a centralized version of these algorithms is developed on top of PostgreSQL, and a distributed version on top of Spark SQL.

These and other features of the present invention will become readily apparent upon further review of the following specification and drawings.

BRIEF DESCRIPTION OF THE DRAWINGS

FIG. 1 shows exemplary database tables that may be the subject of a join-type of relational database query.

FIG. 3 is a chart showing steps in an optimized inequality join method according to the present invention.

FIG. 6 is a chart illustrating results of using an optimized inequality join method according to the present invention for 100M rows on 6 workers.

FIG. 7A is a chart comparing $Q_1$ runtimes of an optimized inequality join method according to the present invention and an inequality join of the prior art.

FIG. 7B is a chart comparing $Q_2$ runtimes of an optimized inequality join method according to the present invention and an inequality join of the prior art.

FIG. 10A is a chart comparing distributed $Q_1$ runtime using an optimized inequality join method according to the present invention vs. prior art.

FIG. 10B is a chart comparing distributed $Q_2$ runtime using an optimized inequality join method according to the present invention vs. prior art.

FIG. 11A is a plot comparing distributed Employees and Events runtime using an optimized inequality join method according to the present invention vs. prior art.

FIG. 11B is a plot comparing distributed Employees2 and Events2 runtime using an optimized inequality join method according to the present invention vs. prior art.

DETAILED DESCRIPTION OF THE PREFERRED EMBODIMENTS

Figure 2:
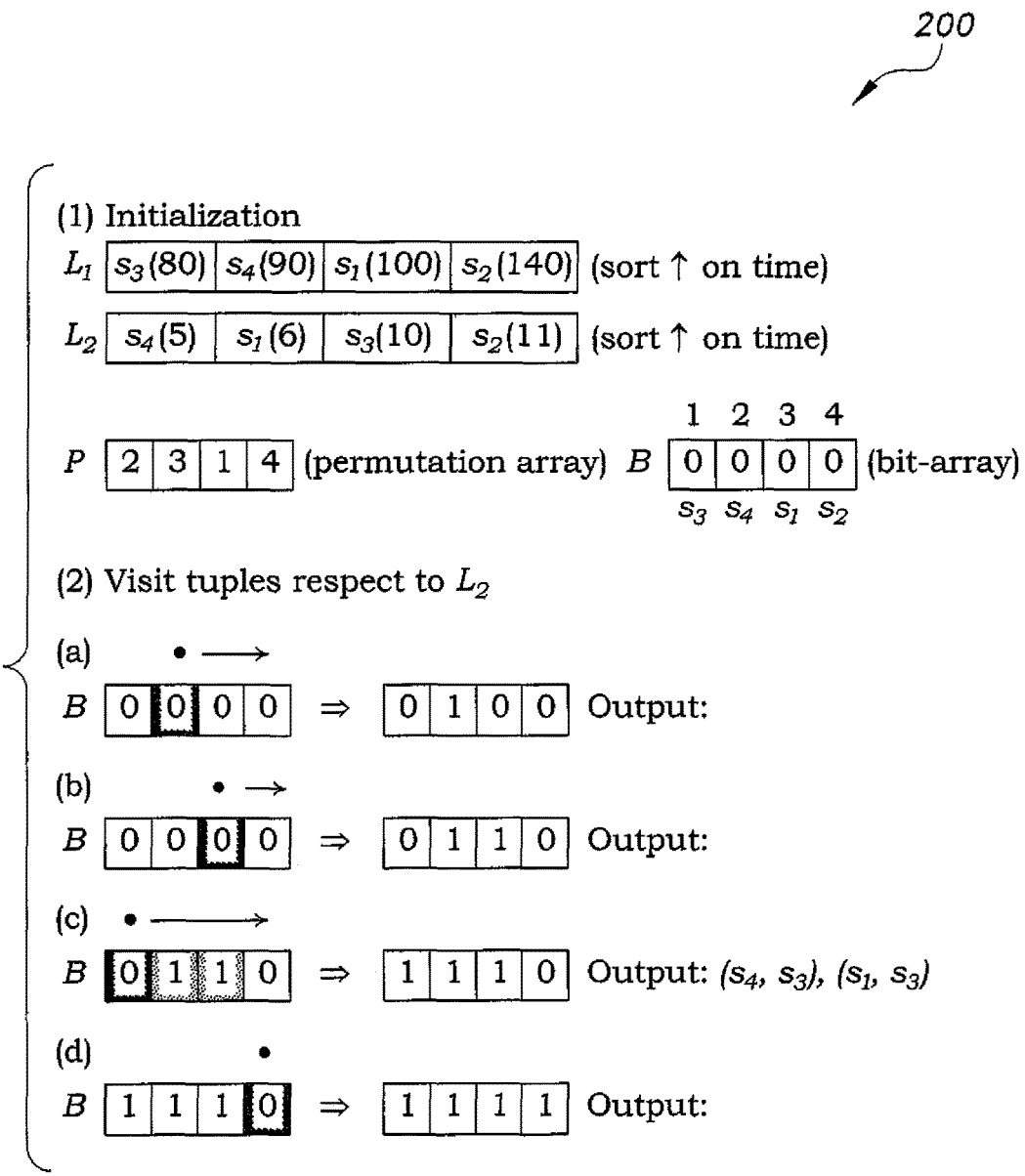
FIG. 2 is a chart showing steps in an optimized inequality join method according to the present invention.

At the outset, it should be understood by one of ordinary skill in the art that embodiments of the present method can comprise software or firmware code executing on a computer, a microcontroller, a microprocessor, or a DSP processor, state machines implemented in application specific or programmable logic; or numerous other forms without departing from the spirit and scope of the present method.

The optimized inequality join method uses permutation arrays to store positional information for sorted attribute values. Moreover, in contrast to sort-merge join, space efficient bit-arrays are used in algorithms that enable optimizations, such as Bloom filter indices, for fast computation of the join results. As examples, a centralized version of these algorithms is developed on top of PostgreSQL, and a distributed version on top of Spark SQL.

FIG. 1 shows tables of an exemplary relational database to query, (table east 101 and table west 102). Consider the west table 102 in FIG. 1 and an inequality self-join query $Q_s$ as follows:

$Q_s$: SELECT $s_1$.t_id, $s_2$.t_id
FROM west $s_1$, west $s_2$
WHERE $s_1$.time>$s_2$.time;

Query $Q_s$ returns a set of pairs $\{(s_i, s_j)\}$ where $s_i$ takes more time than $s_j$; the result is $\{(s_2, s_1), (s_2, s_3), (s_2, s_4), (s_1, s_3), (s_1, s_4), (s_4, s_3)\}$.

A natural idea to handle an inequality join on one attribute is to leverage a sorted array. For instance, we sort west's tuples on time in ascending order into an array $L_1$: $<s_3, s_4, s_1, s_2>$. We denote by L[i] the i-th element in array L, and L[i,j] its sub-array from position i to position j. Given a tuple s, any tuple at $L_1$[k] (k∈{1, i−1}) has a time value that is less than $L_1$[i], the position of s in $L_1$. Consider Example 1, tuple $s_1$ in position $L_1$[3] joins with tuples in positions $L_1$[1, 2], namely $s_3$ and $s_4$.

Let us now consider a more challenging (two predicates) case of a self-join with two inequality conditions:

$Q_p$: SELECT $s_1$.t_id, $s_2$.t_id
FROM west $s_1$, west $s_2$
WHERE $s_1$.time>$s_2$.time AND $s_1$.cost<$s_2$.cost;

$Q_p$ returns pairs $(s_i, s_j)$ where $s_i$ takes more time but pays less than $s_j$; the result is $((s_1, s_3), (s_4, s_3))$.

Similar to attribute time in Example 1, one can additionally sort attribute cost in ascending order into an array $L_2$: $<s_4, s_1, s_3, s_2>$. Thus, given a tuple s, any tuple $L_2$[l] (l∈{j+1, n}), where n is the size of the input relation, has higher cost than the one in s, where j is the position of s in $L_2$. Our observation here is as follows. For any tuple ś, to form a join result (s, ś) with tuple s, the following two conditions must be satisfied: (i) ś is on the left of s in $L_1$, i.e., s has a larger value for time than ś, and (ii) ś is on the right of s in $L_2$, i.e., s has a smaller value for cost than ś. Thus, all tuples in the intersection of L1{1, i−1} and L2{j+1, n} satisfy these two conditions and belong to the join result. For example, $s_4$'s position in $L_1$ (resp. $L_2$) is 2 (resp. 1). Hence, L1{1, 2−1}=$<s_3>$ and $L_2$\{1+1, 4\}=$<s_1, s_3, s_2>$, and their intersection is $\{s_3\}$, producing $(s_4, s_3)$. To get the final result, we simply need to repeat the above process for each tuple.

The challenge is how to perform the aforementioned intersection operation in an efficient manner. There already exist several indices, such as R-tree and B+-tree, that can possibly help. R-tree is ideal for supporting two or higher dimensional range queries. However, the main shortcoming of using R-trees for inequality joins is that it is unclustered; we cannot avoid random I/O access when retrieving join results. B+-tree is a clustered index. The bright side is that for each tuple, only sequential disk scan is required to retrieve relevant tuples. However, the dark side is that we need to repeat this n times, where n is the number of tuples, which is prohibitively expensive. When confronted with such problems, one common practice is to use space-efficient and CPU-friendly indices. In the present optimized inequality join method, we employ a bit-array.

FIG. 2 shows the present optimized inequality join method 200, referred to herein as IEJOIN, for the query of FIG. 1. In the example of FIG. 2, the present method sorts relation west on time and cost, creates a permutation array for cost with respect to (w.r.t.) time, and leverages a bit-array to emit join results. The (1) Initialization process sorts both time and cost values in ascending order, as depicted by $L_1$ and $L_2$, respectively. While sorting, the present method computes a permutation (reordering) array of elements of $L_2$ in $L_1$, as shown by P. For example, the first element of $L_2$ (i.e., $s_4$) corresponds to position 2 in $L_1$. Hence, P[1]=2. Initialize a bit-array B with length n and set all bits to 0, as shown by B with array indices above the rectangles and corresponding tuples below the rectangles. Next, (2) Visit tuples in the order of $L_2$. Scan the permutation array P and operate on the bit-array as shown below. First, (a) Visit P[1]. First visit tuple $s_4$ (1st element in $L_2$) and check in P what is the position of $s_4$ in $L_1$ (i.e., position 2). Then go to B[2] and scan all bits in higher positions than 2. As all B[i]=0 for i>2, there is no tuple that satisfies the join condition of $Q_p$ w.r.t. $s_4$. Finish this visit by setting B[2]=1, which indicates that tuple $s_4$ has been visited. Then, (b) Visit P[2]. This corresponds to tuple $s_1$. It processes $s_1$ in a similar manner as $s_4$, without outputting any result. Then, (c) Visit P[3]. This visit corresponds to tuple $s_3$. Each non-zero bit on the right of $s_3$ (highlighted by grey cells) corresponds to a join result, because each marked cell corresponds to a tuple that pays less cost (i.e., being visited first) but takes more time (i.e., on the right side of its position). It thus outputs $(s_4, s_3)$ and $(s_1, s_3)$. Finally, (d) Visit P[4]. This visit corresponds to tuple $s_2$. The process is similar to the above steps with an empty join result. The final result of $Q_p$ is the union of all the intermediate results from the above steps, i.e., $\{(s_4, s_3)(s_1, s_3)\}$.

There are few observations that make our solution appealing. First, there are many efficient techniques for sorting large arrays, e.g., GPUTeraSort. In addition, after getting the permutation array, we only need to sequentially scan it once. Hence, we can store the permutation array on disk, instead of memory. Only the bit-array is required to stay in memory, to avoid random disk I/Os. Thus, to execute queries $Q_s$ and $Q_p$ on 1 billion tuples, we only need 1 billion bits (i.e., 125 MB) of memory space.

The present method provides a new algorithm that utilizes bit-arrays and positional permutation arrays to achieve fast inequality joins. To handle self joins, an additional new algorithm, referred to as IESELFJOIN, is an additional embodiment. Table 1 details IEJOIN, while Table 2 details IESELFJOIN.

TABLE 1

| IEJOIN Steps (Algorithm 1) |  |
|---|---|
| input: | query Q with two join predicates $t_1$.X $op_1$ $t_2$.Ẋ and $t_1$.Y $op_2$ $t_2$.Ẏ $op_1$, tables T, Ṫ of sizes m and n, respectively. |

TABLE 1-continued

IEJOIN Steps (Algorithm 1)

| | |
|---|---|
| output: | a list of tuple pairs $(t_i, t_j)$ |

| Step | Process |
|---|---|
| 1 | let $L_1$ (resp. $L_2$) be the array of X (resp. Y) in T |
| 2 | let $L'_1$ (resp. $L'_2$) be the array of $\dot{X}$ (resp. $\dot{Y}$) in $\dot{T}$ |
| 3 | if $(op_1 \in \{>, \geq\})$ sort $L_1, L'_1$ in descending order |
| 4 | else if $(op_1 \in \{<, \leq\})$ sort $L_1, L'_1$ in ascending order |
| 5 | if $(op_2 \in \{>, \geq\})$ sort $L_2, L'_2$ in ascending order |
| 6 | else if $(op_2 \in \{<, \geq\})$ sort $L_2, L'_2$ in descending order |
| 7 | compute the permutation array P of $L_2$ w.r.t. $L_1$ |
| 8 | compute the permutation array $\dot{P}$ of $L'_2$ w.r.t. $L'_1$ |
| 9 | compute the offset array $O_1$ of $L_1$ w.r.t. $L'_1$ |
| 10 | compute the offset array $O_2$ of $L_2$ w.r.t. $L'_2$ |
| 11 | initialize bit-array B ($|B| = n$), and set all bits to 0 |
| 12 | initialize join_result as an empty list for tuple pairs |
| 13 | if $(op_1 \in \{\leq, \geq\}$ and $op_2 \in \{\leq, \geq\})$ eqOff = 0 |
| 14 | else eqOff_ = 1 |
| 15 | for (i ← 1 to m) do {outer for loop steps 16-22} |
| 16 | $\text{off}_2 \leftarrow O_2[i]$ |
| 17 | for j ← $O_2[i-1]$ to $O_2[i]$ do {1$^{st}$ inner for loop steps 17-18} |
| 18 | B $[\dot{P}[j]] \leftarrow 1$ |
| 19 | $\text{off}_1 \leftarrow O_1[P[i]]$ |
| 20 | for (k ← $\text{off}_1$ + eqOff to n) do {2$^{nd}$ inner for loop steps 20-22} |
| 21 | if B[j] = 1 then |
| 22 | add tuples w.r.t. ($L_2[i]$, $L'_2[k]$) to join_result |
| 23 | return join_result |

Sorting arrays and computing their permutation array is in O(m·log m+n·log n) time, where m and n are the sizes of the two input relations (lines 3-8). Computing the offset arrays will take linear time using sort-merge (lines 9-10). The outer loop will take O(m·n) time (lines 15-22). Hence, the total time complexity of the algorithm is O(m·log m+n·log n+m·n). It is straightforward to see that the total space complexity is O(m+n).

For multiple join conditions, e.g., for more than two join predicates on a single inequality join, two inequality predicates are picked and IEJOIN is applied. The materialized results are then filtered, and the remaining predicates are evaluated. This approach has very low memory footprint, and it is a standard solution in relational databases. A query optimizer will have to decide which predicate to process first based on the selectivity of different predicates.

A further embodiment includes an algorithm for self-join queries with two inequality operators. While IEJOIN can be used, IESELFJOIN is more efficient for self-joins, since it uses two sorted arrays instead of four.

TABLE 2

IESELFJOIN Steps (Algorithm 2)

| | |
|---|---|
| input: | query Q with two join predicates $t_1.X\ op_1\ t_2.\dot{X}$ and $t_1Y\ op_2\ t_2.\dot{Y}\ op_1$, table T of size n, respectively. |
| output: | a list of tuple pairs $(t_i, t_j)$ |

| Step | Process |
|---|---|
| 1 | let $L_1$ (resp. $L_2$) be the array of X (resp. Y) |
| 2 | if $(op_1 \in \{>, \leq\})$ sort $L_1$ in descending order |
| 3 | else if $(op_1 \in \{<, \geq\})$ sort $L_1$ in ascending order |
| 4 | if $(op_2 \in \{>, \leq\})$ sort $L_2$ in ascending order |
| 5 | else if $(op_2 \in \{<, \leq\})$ sort $L_2$ in descending order |
| 6 | compute the permutation array P of $L_2$ w.r.t. $L_1$ |
| 7 | initialize bit-array ($B|B| = n$), and set all bits to 0 |
| 8 | initialize join_result as an empty list for tuple pairs |
| 9 | if $(op_1 \in \{\leq, \geq\}$ and $op_2 \in \{\leq, \geq\})$ eqOff = 0 |
| 10 | else eqOff_ = 1 |
| 11 | for (i ← 1 to n) do {outer for loop steps 11-16} |
| 12 | pos ← P[i] |
| 13 | for (j ← pos + eqOff to n) do {inner for loop steps 13-15} |
| 14 | if B[j] = 1 then |
| 15 | add tuples w.r.t. ($L_1[j]$, $L_1[i]$) to join_result |
| 16 | B [pos] ← 1 |
| 17 | return join_result |

IESELFJOIN takes a self-join inequality query Q as input, and returns a set of result pairs. The algorithm first sorts the two lists of attributes to be joined (lines 2-5), computes the permutation array (line 6), and sets up the bit-array (line 7), as well as the result set (line 8). It also sets an offset variable to distinguish inequality operators with or without equality (lines 9-10). It then visits the values in $L_2$ in the desired order, which is to sequentially scan the permutation array from left to right (lines 11-16). For each tuple visited in $L_2$, it needs to find all tuples whose X values satisfy the join condition. This is performed by first locating its corresponding position in $L_1$ via looking up the permutation array (line 12). Since the bit-array and L1 have a one-to-one positional correspondence, the tuples on the right of pos will satisfy the join condition on X (lines 13-15), and these tuples will also satisfy the join condition on Y if they have been visited before (line 14). Such tuples will be joined with currently visited tuple as results (line 15). Afterwards, the visited tuple will also be marked (line 16). It finally returns all join results (line 17).

Note that the different sorting orders, i.e., ascending or descending for attribute X and Y in lines 2-5, are chosen to satisfy various inequality operators. One may observe that if the database contains duplicated values, when sorting one attribute X, its corresponding value in attribute Y should be considered, and vice versa, in order to preserve both orders for correct join result. Hence, in IESELFJOIN, when sorting X, an algorithm that also takes Y as the secondary key is used. Specifically, when some X values are equal, their sorting orders are decided by their Y values (lines 2-3), and similarly for the other way around (lines 4-5).

With respect to correctness, it is easy to check that the algorithm will terminate and that each result in join result satisfies the join condition. For completeness, observe that for any tuple pair $(t_1, t_2)$ that should be in the result, $t_2$ is visited first and its corresponding bit is set to 1 (line 16). Afterwards, $t_1$ is visited and the result $(t_1, t_2)$ is identified (lines 14-15) by IESELFJOIN.

Regarding complexity, sorting two arrays and computing their permutation array is in O(n·log n) time (lines 2-8). Scanning the permutation array and scanning the bit-array for each visited tuple run in $O(n^2)$ time (lines 11-16). Hence, in total, the time complexity of IESELFJOIN is $O(n^2)$. It is easy to see that the space complexity of IESELFJOIN is O(n).

A first optimization technique is to use indices to improve the lookup performance for the bit-array. A second optimization technique is to union arrays to improve data locality and reduce the data to be loaded into the cache.

An analysis on both IEJOIN and IESELFJOIN shows that, for each value being visited (i.e., lines 20-22 in Algorithm IEJOIN and lines 13-15 in Algorithm IESELFJOIN) all the bits on the right of the current position need to be scanned. When the query selectivity is high, this is unavoidable for producing the correct results. However, when the query selectivity is low, iteratively scanning a long sequence of O's will be a performance bottleneck. Thus a Bloom filter is adopted to guide which part of the bit-array should be visited. Given a bit-array B with size n and a predefined chunk c, the present Bloom filter is a bit-array with size $\lceil n/c \rceil$ where each bit corresponds to a chunk in B, with 1 indicating that the chunk contains at least a 1, and 0 otherwise.

Figures 4, 5:
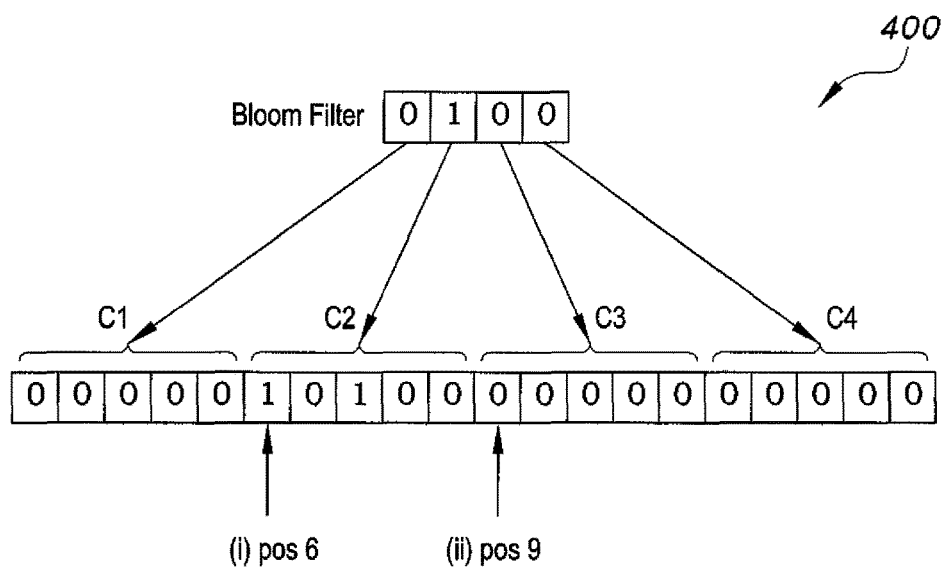
FIG. 4 is a schematic diagram showing exemplary use of a Bloom filter in an optimized inequality join method according to the present invention.
FIG. 5 shows tables illustrating permutation array creation for self-join Qp in an optimized inequality join method according to the present invention.

Consider the bit-array B in FIG. 4. Assume that the chunk size c=4. The bit-array B will be partitioned into four chunks $C_1$-$C_4$. Its Bloom filter 400 consists of 4 bits. We consider two cases. Case (i): visit B[6], in which case we need to find all the 1's in B[i] for i>6. The Bloom filter tells that only chunk 2 needs to be checked, and it is safe to ignore chunks 3 and 4. Case (ii): visit B[9], the Bloom filter can tell that there is no need to scan B, since there cannot be any B[j] where B[j]=1 and j>9.

In testing Algorithm 1, we found that there are many cache loads and stores. A deeper analysis of the algorithm shows that the extra cache loads and stores may be caused by cache misses when sequentially visiting different arrays. As shown in FIG. 3, for example, in Step (2)(a), we visited arrays $L_2$, $O_2$, $\dot{P}$, P and $O_1$ in sequence, with each causing at least one cache miss. Step (2)(b) and Step (2)(c) show a similar behavior. An intuitive solution is to merge the arrays on join attributes and sort them together. Again, as shown in FIG. 3, consider IEJOIN process 300 for query $Q_1$. We can merge $L_1$ and $\dot{L}_1$ into one array and sort them. Similarly, we can merge $L_2$ and $\dot{L}_2$, and P and $\dot{P}$. Also, $O_1$ and $O_2$ are not needed in this case, and $\dot{B}$ needs to be extended to be aligned with the merged arrays. This solution is quite similar to IESELFJOIN. However, we need to prune join results for tuples that come from the same table. This can be easily done using a Boolean flag for each position, where 0 (resp., 1) denotes that the corresponding value is from the first (resp. the second) table. It is experimentally shown that the simple union operation can significantly reduce the number of cache misses, and thus improve the total execution time.

Yet another embodiment provides a distributed version of the IEJOIN along the same lines of state-of-the-art general purpose distributed data processing systems, such as Hadoop's MapReduce and Spark. The present goal encompasses scaling the present algorithm to very large input relations that do not fit into the main memory of a single machine and improving efficiency even further. We assume that work scheduling and data block assignment are handled by any general purpose resource manager, such as YARN (see the web page at hadoop.apache.org/does/current/hadoop-yarn/hadoop-yarn-site/YARN.html) and Mesos (see the web page at mesos.apache.org).

The simplest approach for running IEJOIN in a distributed setting is to: (i) construct k data blocks of each input relation; (ii) apply Cartesian product (or self-Cartesian product for a single relation input) on the data blocks; and (iii) run IEJOIN (either on a single table or two tables input) on the $k^2$ data block pairs. However, this would generate large amounts of network traffic and some data block pairs may not necessarily generate results. A naive work-around would be to reduce the number of blocks for each relation to maximize the usability of each data block. However, very large data blocks introduce work imbalance and require larger memory space for each worker. The present method solves the above distribution challenges by introducing efficient pre-processing and post-processing phases, which allow reduced communication overhead and memory footprint for each node without modifying the data block size. The pre-processing phase generates space-efficient data blocks for the input relation(s); predicts which pair of data blocks may report query results; and copies and transfers through the network only useful pairs of data blocks. IEJOIN, in the distributed version, returns the join results as a pair of row IDs, instead of returning the actual rows. It is the responsibility of the post-processing phase to materialize the final results by resolving the row IDs into actual relation rows. The internal row IDs of Spark SQL are used to uniquely identify different rows, since the input relations may not have a unique row identifier. Distributed IEJOIN (detailed in Table 3) summarizes the implementation of the distributed algorithm when processing two input tables. We omit the discussion about single relation input, since it is straightforward to follow. The distributed join process is composed of three main phases (the pre-processing, IEJOIN, and post-processing phases), which are described herein.

TABLE 3

DISTRIBUTED IEJOIN Steps (Algorithm 3)

| input: | Query q, Table $t_{in1}$, Table $t_{in2}$ $t_2.\dot{Y}$ $op_1$, table T |
| output: | Table $t_{out}$ |

| Step | Process |
|---|---|
| 1 | //Pre-processing |
| 2 | DistT1 ← read $t_{in1}$ in distributed blocks |
| 3 | DistT2 ← read $t_{in2}$ in distributed blocks |
| 4 | foreach row r ∈ DistT1 and DistT2 do |
| 5 | r ← global unique ID |
| 6 | DistT1 ← sort and equally partition DistT1 rows |
| 7 | DistT2 ← sort and equally partition DistT2 rows |
| 8 | forall the block $b_i$ ∈ DistT1 do |
| 9 | $D1_i$ ← pivot and reference values in $b_i$ |
| 10 | $MT1_i$ ← min and max values in pivot and |
| 11 | reference lists of $D1_i$ |
| 12 | forall the block $b_j$ ∈ DistT2 do |
| 13 | $D2_j$ ← pivot and reference values in $b_j$ |
| 14 | $MT2_j$ ← min and max values in pivot and |
| 15 | reference lists of $D2_j$ |
| 16 | $V_{irt}$ ← all block combinations of MT1 and MT2 |
| 17 | forall the ($MT1_i$, $MT2_j$) pairs ∈ $V_{irt_{ij}}$ do |
| 18 | if ($MT1_i$ ∩ $MT2_j$) then |
| 19 | M $Data_{ij}$ ← blocks from $D1_i$ and $D2_j$ |
| 20 | //IEJOIN function |
| 21 | forall the block pairs ($D1_i$, $D2_j$) ∈ M $Data_{ij}$ do |
| 22 | RowID $Result_{ij}$ ← IEJOIN (q, $D1_i$, $D2_j$) |
| 23 | //Post-processing |
| 24 | forall the RawID pairs (i,j) ∈ RowID $Result_{ij}$ do |
| 25 | $row_i$ ← row id i in DistT1 |
| 26 | $row_j$ ← row id j in DistT2 |
| 27 | $t_{out}$ ← merge($row_i$,$row_j$) |

After assigning unique row IDs to each input row (lines 2-5), the pre-processing step globally sorts each relation and partitions each sorted relation to k equally-sized partitions, where the number of partitions depends on the relation size and default block size (lines 6-7). For example, if the default block size is b and the relation input size is M, the number of partitions is M/b. Note that the global sorting maximizes data locality within the partitions, which, in turn, increases the overall runtime efficiency. This is because global sorting partially answers one of the inequality join conditions, where it physically moves tuples closer toward their candidate pairs. In other words, global sorting increases the efficiency of block pairs that generate results, while block pairs that do not produce results can be filtered out before actually processing them. After that, for each sorted partition, we generate a single data block that stores only the attribute values referenced in the join conditions in a list. These data blocks D1 and D2 do not store the actual relation rows in order to reduce the network overhead and reduce its memory footprint. This follows the semi-join principle. Also, metadata that contain the block ID and the min/max values of each referenced attribute value from each data block are extracted (lines 8-15). Then, $k_{MT1}$ and $k_{MT2}$ virtual block combinations are created, and block combinations that do not generate results are filtered out (lines 16-19). Notice that blocks with non-intersecting min-max values do not produce results.

After pre-processing, a list of overlapping block pairs is obtained. IEJOIN is run (either for a single or two relations) for each of these pair blocks in parallel. Specifically, the attribute values in D1 and D2 are merge-sorted, and IEJOIN is executed over the merged block.

The permutation and bit arrays generation are similar to the centralized version. However, the distributed IEJOIN does not have access to the actual relation rows. Therefore, each parallel IEJOIN instance outputs a pair of row IDs that represents the joined rows (lines 21-22). In the final step, the result pairs are materialized by matching each row ID-pair from the output of the distributed IEJOIN with the row IDs of DistT1 and Dist72 (lines 24-27). This post-processing phase is run in parallel as a distributed hash join based on the row IDs to speed up the materialization of the final join results.

PostgreSQL processes a query in a parsing stage, a planning stage, and an execution stage. Parsing extracts relations and predicates and creates query parse trees. Planning creates query plans and invokes the query optimizer to select a plan with the smallest estimated cost. Execution runs the selected plan and emits the output.

With respect to parsing and planning, PostgreSQL uses merge and hash join operators for equijoins and naive nested loop for inequality joins. PostgreSQL looks for the most suitable join operator for each join predicate and extends this check to verify if it is IEJOIN-able by checking if a predicate contains a scalar inequality operator. If so, the operator's OID is saved in the data structure associated with the predicate. For each operator and ordered pair of relations, the list of predicates that the operator can handle is created. For example, two equality predicates over the same pair of relations are associated to one hash join operator.

Next, the Planner estimates the execution cost for possible join plans. Every node in the plan has a base cost, which is the cost of executing the previous nodes, plus the cost for the actual node. Using existing PostgreSQL methods, a cost function is added for the operator, it is evaluated as the sum of the cost for sorting inner and outer relations, CPU cost for evaluating all output tuples (approximated based on the IEJOIN-predicates), and the cost of evaluating additional predicates for each tuple (i.e., the ones that are not involved in the actual join). Next, Postgre SQL selects the plan with the lowest cost.

At the executor, incoming tuples from outer and inner relations are stored into TupleTableSlot arrays. These copies of the tuples are required, as PostgreSQL may not have the content of the tuple at the same pointer location when the tuple is sent for the final projection. This step is a platform-specific overhead that is required to produce an output. The outer relation (of size N) is parsed first, followed by the inner relation (of size M). If the inner join data is identical to the corresponding outer join data (self-join), the inner join data is dropped and the data structure has size N instead of 2N.

The permutation array creation 500 (shown in FIG. 5), comprising left-hand sort 502 and right-hand sort 504, illustrates the data structure and the permutation array computation with an example for the self-join $Q_p$. The data structure is initialized with an index (idx) and a copy of the attributes of interest (time and cost for $Q_p$). Next, the data is sorted for the first predicate (time) using the system function qsort with special comparators (as defined in Algorithm 1) to handle cases where two values for a predicate are equal. The result of the first sort is reported at the left-hand side 502. The last column (pos) is now filled with the ordering of the tuples according to this sorting. As a result, a new array is created to store the index values for the first predicate. This array is used to select the tuple IDs at the time of projecting tuples. The tuples are then ordered again according to the second predicate (cost), as reported in the right-hand side 504. After the second sorting, the new values in pos are the values for the permutation array, denoted by perm.

Finally, a bit-array B of size (N+M) (N in case of self-join) along with a Bloom filter bit-array are created and traversed. If the traversal finds a set bit, the corresponding tuples are sent for projection. Additional predicates (if any) are evaluated at this stage, and if the conditions are satisfied, tuples are projected.

Spark SQL allows users to query structured data on top of Spark. It stores the input data as a set of in-memory Resilient Distributed Datasets (RDD). Each RDD is partitioned into smaller cacheable blocks, where each block fits in the memory of a single machine. Spark SQL takes as input the datasets location(s) in HDFS and an SQL query, and outputs an RDD that contains the query result. The default join operation in Spark SQL is inner join. When passing a join query to Spark SQL, the optimizer searches for equality join predicates that can be used to evaluate the inner join operator as a hash-based physical join operator. If there are no equality join predicates, the optimizer translates the inner join physically to a Cartesian product followed by a selection predicate.

The distributed version of IEJOIN is implemented as a new Spark SQL physical join operator. To make the optimizer aware of the new operator, a new rule is added to recognize inequality conditions. The rule uses the first two inequality conditions for the IEJOIN operator. In case of additional inequality join conditions, it evaluates them as a post selection operation on the output of the first two join conditions. The distributed operator utilizes Spark RDD operators to process the algorithm in distributed fashion. As a result, the distributed IEJOIN operator depends on Spark's memory management to store the user's input relation. If the result does not fit in the memory of a single machine, the result is temporarily stored into Hadoop Distributed File System (HDFS). After all IEJOIN instances finish writing into HDFS, the distributed operator passes the HDFS file pointer to Spark, which constructs a new RDD of the result and passes it to Spark SQL.

We used both synthetic and real-world data (summarized in Table 4) to evaluate the present algorithms.

TABLE 4

Size of the Datasets

| Dataset | Number of Rows | Size |
|---|---|---|
| Employees | 10K-500M | 300 KB-17 GB |
| Employees2 | 1B-6B | 34 GB-215 GB |
| Events | 10K-500M | 322 KB-14 GB |
| Events2 | 1B-6B | 32 GB-202 GB |
| MDC | 24M | 2.4 GB |
| Cloud | 470M | 28.8 GB |

Employees is a dataset that contains employees' salary and tax information with eight attributes: state, married, dependents, salary, tax, and three others for notes. The relation has been populated with real-life data: tax rates, income brackets, and exemptions for each state in the USA have been manually collected to generate synthetic tax records. We used the following self-join query to identify anomalies.

$Q_1$: SELECT r.id, s.id
  FROM Employees r, Employees s
  WHERE r.salary<s.salary AND r.tax>s.tax;

The above query returns a set of employee pairs, where one employee earns higher salary than the other but pays less tax. To make sure that we generate output for $Q_1$, we selected 10% random rows and increased their tax values. Employees2 is a group of larger input datasets with up to 6 Billion records, but with only 0.001% random changes to tax values. The higher selectivity is used to test the distributed algorithm on large input files.

A synthetic dataset that contains start and end time information for a set of independent events. Each event contains the name of the event, event ID, number of attending people, and the sponsor ID. We used this dataset with a self-join query that collects pairs of overlapping events:

$Q_2$: SELECT r.id, s.id
  FROM Events r, Events s
  WHERE r.start≤Ss.end AND r.end≥ s.start AND r.id≠s.id;

Again, to make sure we generate output for $Q_2$, we selected 10% random events and extended their end values. We also generate Events2 as larger datasets with up to 6 Billion records, but with 0.001% extended random events.

The Mobile Data Challenge (MDC) is a 50 GB real dataset that contains behavioral data of nearly 200 individuals collected by Nokia Research, a website found at www.idiap.ch/dataset/mdc.

The dataset contains physical locations, social interactions, and phone logs of the participating individuals. We used two relations, Shops and Persons, from the dataset with the following join query that, for all shops, looks for all persons that are close to a shop up to a distance c along the x-axis (xloc) and the y-axis (yloc):

$Q_3$: SELECT s.name, p.name
  FROM Shops s, Persons p
  WHERE s.xloc−c<p.xloc AND s.xloc+c>p.xloc AND
    s.yloc−c<p.yloc AND s.yloc+c>p.yloc.

Cloud A is a real dataset that contains cloud reports from 1951 to 2009, through land and ship stations. The dataset may be obtained by File Transfer Protocol from cdiac.ornl.gov/pub3/ndp026c/.

We used a self-join query $Q_4$, similar to $Q_3$, to compute for every station all stations within a distance c=10. Since the runtime for $Q_3$ and $Q_4$ is dominated by the output size, we mostly used them for scalability analysis in the distributed case.

We evaluated the following centralized systems in our experiments: (1) PG-IEJOIN. We implemented IEJOIN inside Post-greSQL v9.4. We compare it against the baseline systems. (2) PG-Original. We use PostgreSQL v9.4 as a baseline since it is the most widely used open source DBMS. We ran automatic configuration tuning with pgtune to maximize the benefit from large main memory. (3) PG-BTree & PG-GiST. For optimization purposes, we use indices for $Q_1$ and $Q_2$ with two alternative approaches: a B-tree index and GiST. For PG-BTree, we define a B-tree index for each attribute in a query. For PG-GiST, we use the GiST access method built inside PostgreSQL, which considers arbitrary indexing schemes and automatically selects the best technique for the input relation. Although $Q_1$ and $Q_2$ appear similar, they require different data representation to be able to index them using GiST. The inequality attributes in $Q_1$ are independent; each condition forms a single open interval. However, the inequality attributes in $Q_2$ are dependent; together they form a single closed interval. To use GiST in $Q_1$, we had to convert salary and tax attributes into a single geometric point data type SalTax, as shown in $Q_{1i}$. Similarly for $Q_2$, we converted start and end attributes into a single range data type StartEnd, as shown in $Q_{2i}$.

$Q_{1i}$: SELECT r.id, s.id
  FROM Employees r, Employees s
  WHERE r.SalTax>^s.SalTax AND r.SalTax>>s.SalTax;

$Q_{2i}$: SELECT r.id, s.id
  FROM Events r, Events s
  WHERE r.StartEnd && s.StartEnd AND r.id≠s.id;

In the rewriting of the above queries in PG-GiST, operator \>^" corresponds to \is above?", operator \_" means\is strictly right of?", and operator \&&" indicates \overlap?". For geometric and range type, GiST uses a Bitmap index to optimize its data access with large datasets. We used MonetDB Database Server Toolkit v1.1 (October2014-SP2), which is an open-source column-oriented database, in a disk partition of size 669 GB. For DBMS-X, We used a leading commercial centralized relational database.

For the centralized evaluation, we used a Dell Precision T7500 equipped with two 64-bit quad-core Intel Xeon X5550 (8 physical cores and 16 CPU threads) and 58 GB RAM.

For the distributed systems experiments, we used the following systems: (1) Spark SQL-IEJOIN. We implemented IEJOIN inside Spark SQL v1.0.2 (see the web page at spark.apache.org/sql/). We evaluated the performance of our techniques against the baseline systems below. (2) Spark SQL & Spark SQL-SM. Spark SQL is the default implementation in Spark SQL. Spark SQL-SM is an optimized version based on distributed sort-merge join. It contains three phases: partitioning, sorting, and joining.

Partitioning selects a join attribute to distribute the data based on some statistics, e.g., cardinality estimation. Sorting sorts each partition into many sorted lists. Each list corresponds to an inequality condition. Finally, we apply a distributed sort merge join over the sorted lists to produce results. We also improve the above method by pruning the non-overlapping partitions to be joined.

For DPG-BTree & DPG-GiST, we use a commercial version of PostgreSQL with distributed query processing. This allows us to compare Spark SQL-IEJOIN to a distributed version of PG-BTree and PG-GiST. For multi-node experimental setup, we use a compute cluster of 17 Shuttle SH55J2 machines (1 master with 16 workers) equipped with Intel i5 processors with 16 GB RAM, and connected to a high-end Gigabit switch.

For the Bloom filter, we run query $Q_2$ on 10M tuples to show the performance gain of using a Bloom filter. Results are shown in Table 5.

TABLE 5

| Bloom Filters on 10 m Rows (Events Data) | | | | | |
|---|---|---|---|---|---|
| Chunk (bit) | | | | | |
| 1 | 64 | 256 | 1024 | 4096 | 16384 |
| Time (sec) >1 day | 1623 | 896 | 296 | 158 | 232 |

Note that the chunk size is an optimization parameter that is machine specific. For this experiment, L1 cache was 256

KB. Intuitively, the larger the chunk size the better. However, a very large chunk size defeats the purpose of using Bloom filters to reduce the bit-array scanning overhead. The experiment shows that the performance gain is 3× between 256 bits and 1,024 bits and 1.5× between 1,024 bits and 4,096 bits. Larger chunk sizes show worse performance, as shown with chunk size of 16,384 bits.

TABLE 6

Cache Statistics on 10m Rows (Events Data)

| Parameter (M/sec) | IEJOIN (union) | IEJOIN |
|---|---|---|
| cache-references | 6.5 | 8.4 |
| cache references-misses | 3.9 | 4.8 |
| L1-dcache-loads | 459.9 | 1240.6 |
| L1-dcache-load-misses | 8.7 | 10.9 |
| L1-dcache-stores | 186.8 | 567.5 |
| L1-dcache-store-misses | 1.9 | 1.9 |
| L1-dcache-prefetches | 4.9 | 7.0 |
| L1-dcache-prefetch-misses | 2.2 | 2.7 |
| LLC-loads | 5.1 | 6.6 |
| LLC-load-misses | 2.9 | 3.7 |
| LLC-stores | 3.8 | 3.7 |
| LLC-store-misses | 1.1 | 1.2 |
| LLC-prefetches | 3.1 | 4.1 |
| LLC-prefetch-misses | 2.2 | 2.9 |
| DTLB-loads | 544.4 | 1,527.2 |
| DTLB-load-misses | 0.9 | 1.6 |
| DTLB-stores | 212.7 | 592.6 |
| DTLB-store-misses | 0.1 | 0.1 |
| Total time (sec) | 125 | 325 |

For union arrays, to show the performance gain due to the union optimization, we run IEJOIN, with and without the union array, using 10M tuples from the Events dataset. We collect the following statistics, shown in Table 6: (i) L1 data caches (dcache), (ii) last level cache (LLC), and (iii) data translation lookaside buffer (dTLB). Note that the optimized algorithm with union arrays is 2.6 times faster than the original one. The performance gain in the optimized version is due to the lower number of cache loads and stores (L1-dcache-loads, L1-dcache-stores, dTLB-loads and TLB-stores), which is 2.7 to 3 times lower than the original algorithm. This behavior is expected since the optimized IEJOIN has fewer arrays compared with the original version.

TABLE 7

Time breakdown (secs) of FIG. 6

| Query | Pre-process | IEJOIN | PostProcess | Total |
|---|---|---|---|---|
| With global sorting | | | | |
| $Q_1$ | 632 | 162 | 519 | 1,313 |
| $Q_2$ | 901 | 84 | 391 | 1,376 |
| W/O global sorting | | | | |
| $Q_1$ | 1,025 | 1,714 | 426 | 3,165 |
| $Q_2$ | 1,182 | 1,864 | 349 | 3,395 |

Global sorting on distributed IEJOIN is as follows. As presented in Algorithm 3, the distributed version of our algorithm applies global sorting at the pre-processing phase (lines 6-7). In this experiment, we compare the performance of $Q_1$ and $Q_2$ with and without global sorting. Plot 600 of FIG. 6 shows the results of this experiment. At a first glance, one may think that the global sorting affects the performance of distributed IEJOIN, as it requires shuffling data through the network. However, global sorting improves the performance of the distributed algorithm by 2.4 to 2.9 times. This is because global sorting allows us to filter out block-pair combinations that do not generate results. We also observe that the time required by the IEJOIN process itself is one order of magnitude faster when using global sorting.

We further breakdown the runtime of $Q_1$ and $Q_2$ in Table 7 to measure the impact of global sorting. Here, the pre-processing time includes the data loading from HDFS, global sorting, partitioning, and block-pairs materialization. Even though global sorting increases the overhead of the pre-processing phase, we observe that the runtime for this phase is at least 30% less compared with the case without global sorting due to the reduced network overhead from eliminating unnecessary block pairs. The results confirm the above observation. IEJOIN is one order of magnitude faster when pre-processing includes global sorting. This greatly reduces the network overhead and increases the memory locality in the block combinations that are passed to the present algorithm. Based on the above experiments, in the following tests we used 1,024 bits as the default chunk size, union arrays, and global sorting for distributed IEJOIN.

In this set of experiments, we study the efficiency of IEJOIN on datasets that fit the main memory of a single compute node and compare its performance with alternative centralized systems.

With respect to IEJOIN vs. baseline systems, Plots 700a and 700b of FIGS. 7A and 7B show the results for queries Q1 and Q2 in a centralized environment, where the x-axis represents the input size in terms of the number of tuples, and the y-axis represents the corresponding running time in seconds. The Figure reports that PG-IEJOIN outperforms all baseline systems by more than one order of magnitude for both queries and for every reported dataset input size. In particular, PG-IEJOIN is up to more than three (resp., two) orders of magnitude faster than PG-Original and MonetDB (resp., DBMS-X). We can clearly see that the baseline systems cannot compete with PG-IEJOIN, since they all use the classic Cartesian product followed by a selection predicate to perform queries with only inequality join conditions. In fact, this is the main reason why they cannot run for bigger datasets.

Figures 8A, 8B:
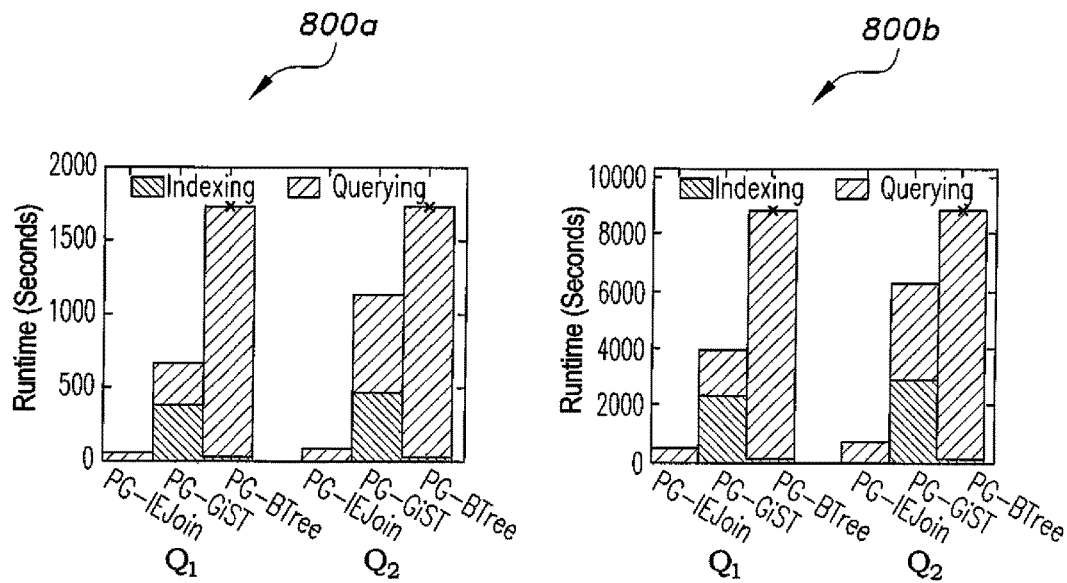
FIG. 8A is a chart comparing runtimes for 10M rows of an optimized inequality join method according to the present invention and an inequality join of the prior art.
FIG. 8B is a chart comparing runtimes for 50M rows of an optimized inequality join method according to the present invention and an inequality join of the prior art.

To compare IEJOIN vs. indexing, we now consider two different variants of PostgreSQL, each using a different indexing technique (GiST and BTree), to better evaluate the efficiency of the present algorithm with bigger datasets in a centralized environment. We run $Q_1$ and $Q_2$ on datasets with 10M and 50M records. Plots 800a and 800b of FIGS. 8A and 8B present the results. In both experiments, IEJOIN is more than one order of magnitude faster than PG-GiST. In fact, IEJOIN is more than three times faster than the GiST indexing time alone. We stopped PG-BTree after 24 hours of runtime. The present algorithm performs better than these two baseline indices because it better utilizes the memory locality.

We observe that the memory consumption for MonetDB increases exponentially with the input size. For example, MonetDB uses 419 GB for an input dataset with only 200K records. In contrast to MonetDB, IEJOIN makes better use of the memory. Table 8 shows that IEJOIN uses around 150 MB for $Q_1$ (or less for $Q_2$) for an input dataset of 200K records (MonetDB requires two orders of magnitude more memory). Note that in Table 8, we report the overall memory used by sorted attribute arrays, permutation arrays, and the bit-array. Moreover, although IEJOIN requires only 9.3 GB of memory for an input dataset of 10M records, it runs to completion in less than one hour (3,128 seconds) for a dataset producing more than 7 billion output records.

TABLE 8

Runtime and memory usage (PG-IEJoin)

| Query | Input | Output | Time(sec) | Mem (GB) |
|---|---|---|---|---|
| $Q_1$ | 100K | 9K | 0.30 | 0.1 |
| $Q_1$ | 200K | 23K | 0.28 | 0.2 |
| $Q_1$ | 350K | 68K | 1.12 | 0.3 |
| $Q_1$ | 10M | 3M | 67.5 | 7.6 |
| $Q_2$ | 100K | 0.2K | 0.14 | 0.4 |
| $Q_2$ | 200K | 0.8K | 0.28 | 0.8 |
| $Q_2$ | 1M | 42K | 11.51 | 1.3 |
| $Q_2$ | 10M | 2M | 92.53 | 9.3 |
| $Q_3$ | 500K | 154M | 63.37 | 0.4 |
| $Q_3$ | 1.5M | 1B | 453.79 | 1.1 |
| $Q_3$ | 2M | 2B | 822.63 | 1.3 |
| $Q_3$ | 4M | 7B | 3,128.03 | 3.0 |

We further analyze the breakdown time of IEJOIN on the 50M rows datasets, as shown in Table 9. The table shows that, by excluding the time required to load the dataset into memory, scanning the bit-array takes only 40% of the overall execution time where the rest is mainly for sorting. This shows the high efficiency of the present algorithm.

TABLE 9

Time breakdown on 50M rows

| Query | Data Reading | Data Sorting | Bitarray Scanning | Total Time (secs) |
|---|---|---|---|---|
| $Q_1$ | 158 | 240 | 165 | 563 |
| $Q_1$ | 319 | 332 | 215 | 866 |

Figures 9A, 9B, 9C:
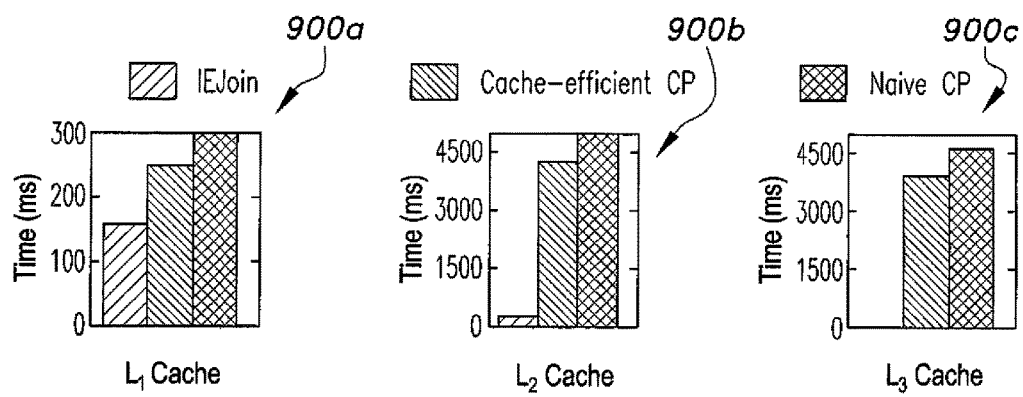
FIG. 9A is a chart illustrating $Q_1$ runtime for data that fits an L1 cache using an optimized inequality join method according to the present invention.
FIG. 9B is a chart illustrating $Q_1$ runtime for data that fits an L2 cache an optimized inequality join method according to the present invention.
FIG. 9C is a chart illustrating $Q_1$ runtime for data that fits an L3 cache an optimized inequality join method according to the present invention.

Comparing IEJOIN vs. cache-efficient Cartesian product, we now push further our evaluation to better highlight the memory locality efficiency of IEJOIN. We compare its performance with both naive and cache efficient Cartesian product joins for Q1 on datasets that fit the L cache (256 KB), L2 cache (1 MB), and L3 cache (8 MB) of the Intel Xeon processor. We used 10K rows for L1 cache, 40K rows for L2 cache, and 350K rows for L3 cache. Plots 900a, 900b, and 900c of FIGS. 9A, 9B, and 9C report the results of this experiment. When the dataset fits in the L1 cache, IEJOIN is 1.8 times faster than the cache-efficient Cartesian product and 2.4 times faster than the naive Cartesian product. Furthermore, as we increase the dataset size of Q1 to be stored at the L2 and L3 caches, we see that IEJOIN becomes one and two orders of magnitude faster than the Cartesian product, respectively. This is because of the delays of L2 and L3 caches and the complexity of the Cartesian product.

For single nodes, IEJOIN outperforms existing baselines by at least an order of magnitude for two main reasons. It avoids the use of the expensive Cartesian product, and it nicely exploits memory locality by using memory contiguous data structures with a small footprint. In other words, our algorithm avoids as much as possible going to memory to fully exploit the CPU speed.

Figure 12A:
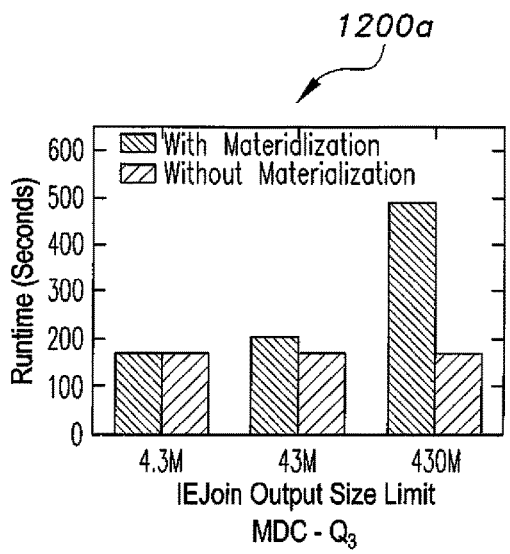
FIG. 12A is a chart illustrating MDC $Q_3$ runtime using an optimized inequality join method according to the present invention vs. prior art.
Figure 12B:
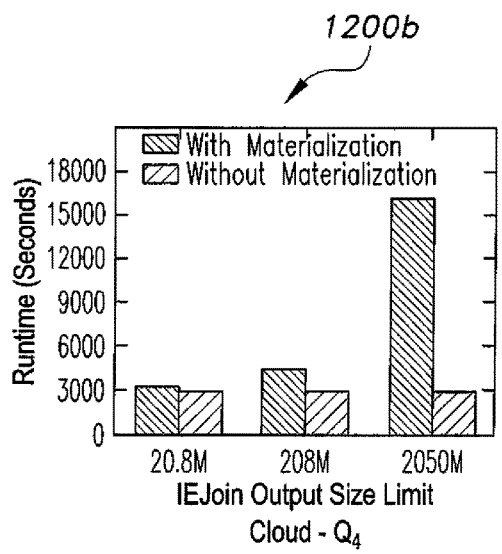
FIG. 12B is a chart illustrating Cloud $Q_4$ runtime using an optimized inequality join method according to the present invention vs. prior art.

Comparing Distributed IEJOIN vs. baseline systems, it is worth noting that we had to run these experiments on a cluster of 6 compute nodes only, due to the limit imposed by the free version of the distributed PostgreSQL system. Additionally, in these experiments, we stopped the execution of any system that exceeds 24 hours. FIG. 10 shows the results of all distributed systems we consider for queries $Q_1$ and $Q_2$. This figure again shows that the present method significantly outperforms all baseline systems. It is at least one order of magnitude faster that all other systems. In particular, we observe that only DPG-GiST could terminate before 24 hours for Q2. In such a case, IEJOIN is twice faster than the time required to run GiST indexing alone. These results show the high superiority of our algorithm over all baseline systems also in a distributed environment. In terms of scaling input size, we further push the evaluation of the efficiency in a distributed environment with bigger input datasets, from 100M to 500M records with large results size (Employees & Events), and from 1B to 6B records with smaller results size (Employees2 & Events2). As we now consider IEJOIN only, we run this experiment on our entire 16 compute nodes cluster. Plots 1100a and 1100b of FIG. 11 show the run-time results, as well as the output sizes. We observe that IEJOIN gracefully scales along with input dataset size in both scenarios. We also observe in plot 1100a of FIG. 11A that when the output size is large, the runtime increases accordingly, as it is dominated by the materialization of the results. In plot 1100a, $Q_1$ is slower than $Q_2$ as its output is three orders of magnitude larger. When the output size is relatively small, both $Q_1$ and $Q_2$ scale well with increasing input size (see plot 1100b of FIG. 11B). Below, we study in more detail the impact of the output size on performance. For scaling dataset output size, we test the present system's scalability in terms of the output size using two real datasets (MDC and Cloud), as shown in plots 1200a and 1200b of FIGS. 12A and 12B, respectively. To have a full control on this experiment, we explicitly-limit the output size from 4.3M to 430M for MDC, and 20.8M to 2050M for Cloud. The figures clearly show that the output size affects the runtime. The larger the output size, the longer it will take to produce them. They also show that materializing a large number of results is costly. Using plot 1200a of FIG. 12A, for example, when the output size is small (i.e., 4.3M), materializing them or not will have similar performance. However, when the output size is big (i.e., 430M), materializing the results takes almost ⅔ of the entire running time, as expected. In order to run another set of experiments with much bigger output size, we created two variants of $Q_3$ for MDC data by keeping only two predicates over four (less selectivity).

Figure 13A:
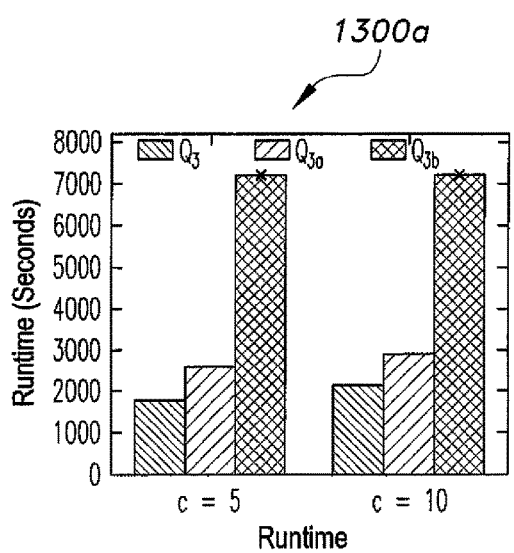
FIG. 13A is a chart illustrating runtime using an optimized inequality join method according to the present invention without result materialization.
Figure 13B:
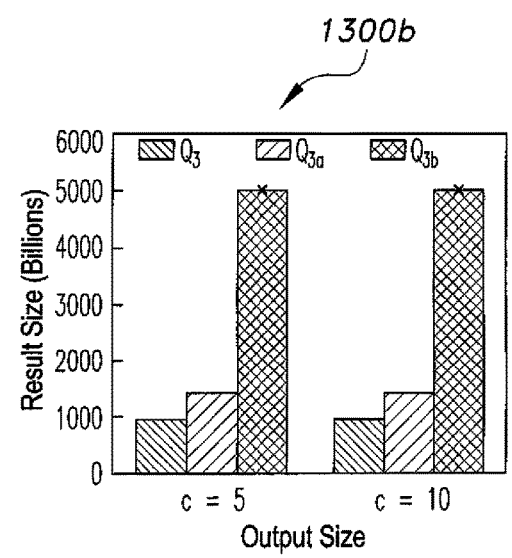
FIG. 13B is a chart illustrating output size using an optimized inequality join method according to the present invention without result materialization.

FIGS. 13A and 13B, plots 1300a and 1300b, respectively, show the scalability results of these experiments with no materialization of results. For $Q_{3a}$, IEJOIN produced more than 1,000B records in less than 3,000 seconds. For $Q_{3b}$, we stopped the execution after 2 hours with more than 5,000B tuples in the temporary result. This demonstrates the good scalability of our solution.

With respect to multi-node summary, similar to the centralized environment, IEJOIN outperforms existing baselines by at least one order of magnitude. In particular, we observe that it gracefully scales in terms of input (up to 6B input tuples). This is because our algorithm first performs a join at the metadata level, which is orders of magnitude smaller than the actual data. As a result, it shuffles only those data partitions that can potentially produce join results. Typically, IEJOIN processes a small number of data partitions.

Several cases of inequality joins have been studied. These include band joins, interval joins and, more generally, spatial joins. IEJOIN is specially optimized for joins with at least two predicates in (\<", \>", \_", \_"). A band join of two relations R and S has a join predicate that requires the join attribute of S to be within some range of the join attribute of R. The join condition is expressed as $R.A - c_1 \leq S.B \& S.B \leq R.A + c_2$, where $c_1$ and $c_2$ are constants. The band-join algorithm partitions the data from relations R and S into partitions $R_i$ and S irrespectively, such that for every tuple $r \in R$, all tuples of S that join with r appear in $S_i$. It assumes that $R_i$ fits into memory. Contrary to IEJOIN, the band join is limited to a single inequality condition type, involving one single attribute from each column. IEJOIN works for any inequality conditions and attributes from the two relations. While band join queries can be processed using our algorithm, not all IEJOIN queries can run with a band join algorithm. Interval joins are frequently used in temporal and spatial data. Some prior art proposes the use of the relational Interval Tree to optimize joining interval data. Each interval intersection is represented by two inequality conditions, where the lower and upper times of any two tuples are compared to check for overlaps. The prior work optimizes nonequijoins on interval intersections, where they represent each interval as a multi-value attribute. Compared to our work, they only focus on improving interval intersection queries and cannot process general purpose inequality joins.

Spatial indexing is widely used in several applications with multidimensional datasets, such as Bitmap indices, R-trees and space filling curves. In PostgreSQL, support for spatial indexing algorithms is provided through a single interface known as Generalized index Search Tree. From this collection of indices, Bitmap index is the most suitable technique to optimize multiple attribute queries that can be represented as 2-dimensional data. Examples of 2-dimensional datasets are intervals (e.g., start and end time in $Q_2$), GPS coordinates (e.g., $Q_3$), and any two numerical attributes that represent a point in an XY plot (e.g., salary and tax in $Q_1$). The main disadvantage of the Bitmap index is that it requires large memory footprint to store all unique values of the composite attributes. Bitmap index is a natural baseline for our algorithm, but, unlike IEJOIN, it does not perform well with high cardinality attributes, as demonstrated in plot 600 of FIG. 6. R-trees, on the other hand, are not suitable because an inequality join corresponds to window queries that are unbounded from two sides, and consequently intersect with a large number of internal nodes of the R-tree, generating unnecessary disk accesses. Several proposals have been made to speed-up join executions in MapReduce. However, they focus on joins with equalities and hence are forced to perform massive data shuffling to be able to compare each tuple with each other. There have been few attempts to devise efficient implementation of theta-join in MapReduce focuses on pair-wise theta-join queries. It partitions the Cartesian product output space with rectangular regions of bounded sizes. Each partition is mapped to one reducer. The proposed partitioning guarantees correctness and work-load balance among the reducers, while minimizing the over-all response time further extends to solve multi-way theta-joins. It proposes an I/O and network cost-aware model for MapReduce jobs to estimate the minimum time execution costs for all possible decomposition plans for a given query, and selects the best plan given a limited number of computing units and a pool of possible jobs. We propose a new algorithm to do the actual inequality join based on sorting, permutation arrays, and bit arrays. The focus in these previous proposals is on efficiently partitioning the output space and on providing a cost model for selecting the best combination of MapReduce jobs to minimize response time. In both proposals, the join is performed with existing algorithms, which in the case of inequality conditions corresponds to Cartesian product followed by a selection.

In yet another example of the effectiveness of the present method of performing inequality joins, consider data being collected in a database with schema as described in Table 10.

TABLE 10

Laboratory Sensor Data Schema

| date:yyyy-mm-dd | time:hh:mm:ss.xxx | epoch:int | moteid:int | temperature:real | humidity:real | light:real | voltage:real |
|---|---|---|---|---|---|---|---|

An alarm is raised in case of anomalies in the laboratory. For this goal, check queries are continuously executed on the sensor data to monitor the status of the laboratory. For example, a query monitor that for a sensor, an alarm should be raised if, in a window of 10 minutes, there are (1) a raise in the temperature of more than 2 degrees; and (2) a decrease in the voltage. This check corresponds to an inequality join being executed on the dataset, such as the aforementioned IEJOIN. By using IEJOIN, the execution time to raise the alarm is close to real-time, while prior art solutions can take a long time to compute the result. In other words, the execution time is orders of magnitude faster using IEJOIN.

It is to be understood that the present invention is not limited to the embodiments described above, but encompasses any and all embodiments within the scope of the following claims.

We claim:

1. An optimized inequality join method performed by a digital computer, the method comprising the steps of:
   (a) inputting a relational table;
   (b) inputting a query Q on the relational table, the query Q including a first inequality and a second inequality connected by a logical AND operator, defining an inequality join;
   (c) sorting in predetermined order a relation s, based on attribute values of the first inequality;
   (d) storing sorted attribute values of step (c) in a first initialization array, $L_1$;
   (e) sorting in predetermined order the relation s, based on attribute values of the second inequality;
   (f) storing sorted attribute values of step (e) in a second initialization array, $L_2$;
   (g) computing a permutation (reordering) array P of elements of $L_2$ in $L_1$ wherein P points to corresponding $s_i$ elements of $L_2$ and $L_1$;
   (h) initializing a bit-array B with length n being the size of $L_1$ wherein all bits of B are set to 0 and bit positions of B index tuples held in corresponding positions of array $L_1$;
   (i) using P to scan $L_1$ and $L_2$ tuples in the order of $L_2$;
   (j) for each $L_1$ tuple scanned, determining the corresponding position in the bit-array B;
   (k) inhibiting scanning of higher positions in the bit-array B if the higher bit array B positions remain "0";
   (l) placing a "1" in the position in the bit-array B corresponding to the bit position determined in step (j) to indicate that the tuple in step (j) has been scanned;
   (m) when steps (i), (j), (k) and (l) have been completed for all tuples, reading higher significant bit positions in B vs. lowest significant bit position in B to determine the tuples that satisfy the first and second inequalities; and (n) outputting the tuples satisfying the first and second inequalities as determined in step (m), wherein the outputted tuples represent a union of all the intermediate results from the preceding steps.

2. The optimized inequality join method according to claim 1, further comprising the step of storing bit-array B in random access memory of the digital computer to avoid random disk input/output (I/O) operations.

3. The optimized inequality join method according to claim 1, wherein the predetermined order step (c) is descending order if the first inequality has a relation selected from the set $\{>, \leq\}$.

4. The optimized inequality join method according to claim 1, wherein the predetermined order step (c) is ascending order if the first inequality has a relation selected from the set $\{<, \geq\}$.

5. The optimized inequality join method according to claim 1, wherein the predetermined order step (e) is descending order if the second inequality has a relation selected from the set $\{>, \leq\}$.

6. The optimized inequality join method according to claim 1, wherein the predetermined order step (e) is ascending order if the second inequality has a relation selected from the set $\{<, \geq\}$.

7. The optimized inequality join method according to claim 1, further comprising the step of using indices to improve the lookup performance for the bit-array B.

8. The optimized inequality join method according to claim 7, wherein the step of using indices further comprises the step of establishing a Bloom filter to guide which part of the bit-array B should be visited.

9. The optimized inequality join method according to claim 1, wherein the predetermined order sorting step (e) is descending order if the first inequality join condition has a relation selected from the set $\{>, \leq\}$.

10. The optimized inequality join method according to claim 1, wherein the predetermined order sorting step (e) is ascending order if the first inequality join condition has a relation selected from the set $\{<, \geq\}$.

11. The optimized inequality join method according to claim 1, wherein the predetermined order sorting step (f) is descending order if the second inequality join condition has a relation selected from the set $\{>, \leq\}$.

12. The optimized inequality join method according to claim 1, wherein the predetermined order sorting step (f) is ascending order if the second inequality join condition has a relation selected from the set $\{<, \geq\}$.

13. An optimized inequality join method performed by a digital computer, the method comprising the steps of:
(a) inputting first and second relational tables T and T́ of sizes m and n, respectively;
(b) inputting a query Q with two join predicates, including a first inequality join condition $t_1.X$ $op_1$ $t_2.\acute{X}$ and a second inequality join condition $t_1.Y$ $op_2$ $t_2.\acute{Y}$ $op_1$;
(c) assigning $L_1$ (resp. $L_2$) as an array of X (resp. Y) in T;
(d) assigning $\acute{L}_1$ (resp. $\acute{L}_2$) as an array of $\acute{X}$ (resp. $\acute{Y}$) in T́;
(e) sorting in predetermined order $L_1, \acute{L}_1$;
(f) sorting in predetermined order $L_2, \acute{L}_2$;
(g) computing a permutation (reordering) array P of $L_2$ w.r.t. $L_1$;
(h) computing a permutation (reordering) array $\acute{P}$ of $\acute{L}_2$ w.r.t. $\acute{L}_1$;
(i) computing an offset array $O_1$ of $L_1$ w.r.t. $\acute{L}_1$;
(j) computing an offset array $O_2$ of $L_2$ w.r.t. $\acute{L}_2$;
(k) initializing a bit-array $\acute{B}$ ($|\acute{B}|$=n), while setting all bits in $\acute{B}$ to 0, $\acute{B}$ positions pointing to relation s, held in corresponding position of $\acute{L}_1$;
(l) initializing a join_result as an empty list for tuple pairs;
(m) inhibiting scanning of higher positions in the bit-array $\acute{B}$ if the higher bit array $\acute{B}$ positions remain "0";
(n) placing a "1" in the position in the bit-array $\acute{B}$ corresponding to a bit position determined during a scan based on the permutation array P and the first offset array $O_1$;
(o) placing a "1" in the position in the bit-array $\acute{B}$ corresponding to a bit position determined during a scan based on the permutation array $\acute{P}$ and the second offset array $O_2$;
(p) when the scans have been completed for all tuples, reading higher significant bit positions in $\acute{B}$ vs lowest significant bit position in $\acute{B}$ to determine the tuples that satisfy the first and second inequality join conditions while adding the inequality join satisfying tuples to the join_result list; and
(q) outputting the join_result list, wherein the outputted tuples in the join_result list represent a union of all the intermediate results from the preceding steps.

14. An optimized inequality join method performed by digital computers in a distributed processing environment, the method comprising the steps of:
(a) reading first relational table Table $t_{in1}$ in distributed blocks $b_i$ of distributed table DistT1;
(b) reading second relational table, Table $t_{in2}$ in distributed blocks $b_j$ of distributed table DistT2;
(c) assigning a global unique ID to each row r that is an element of DistT1 and DistT2;
(d) sorting and equally partitioning said DistT1 rows;
(e) sorting and equally partitioning said DistT2 rows;
(f) assigning pivot and reference values in $b_i$ to $D1_i$ for all $b_i \in$ DistT1;
(g) assigning min and max values in pivot and reference lists of $D1_i$ to $MT1_i$;
(h) assigning pivot and reference values in $b_j$ to $D2_j$ for all $b_j \in$ DistT2;
(i) assigning min and max values in pivot and reference lists of $D2_j$ to $MT2_j$;
(j) assigning to $V_{irt} \leftarrow$ all block combinations of MT1 and MT2;
(k) for all $(MT1_i, MT2_j)$ pairs $\in V_{irt_{ij}}$ where $(MT1_i \cap MT2_j)$, assigning to M Data$_{ij} \leftarrow$ blocks from $D1_i$ and $D2_j$ wherein steps (a) through (k) are pre-processing steps;
(l) for all of the block pairs $(D1_i, D2_j) \in$ M Data$_{ij}$, doing RowID Result$_{ij} \leftarrow$ IEJOIN (q, $D1_i$, $D2_j$), wherein step (l) is an IEJOIN function call; and
(m) for all the RowID pairs $(i, j) \in$ RowID Result$_{ij}$, doing:
row$_1 \leftarrow$ row id i in DistT1
row$_j \leftarrow$ row id j in DistT2
$t_{out} \leftarrow$ merge(row$_i$, row$_j$)
wherein step (m) is a post-processing step.

* * * * *